June 11, 1957   F. L. HAUSHALTER   2,795,036
METHOD OF MAKING A VIBRATION DAMPER
Filed March 29, 1954   2 Sheets-Sheet 1
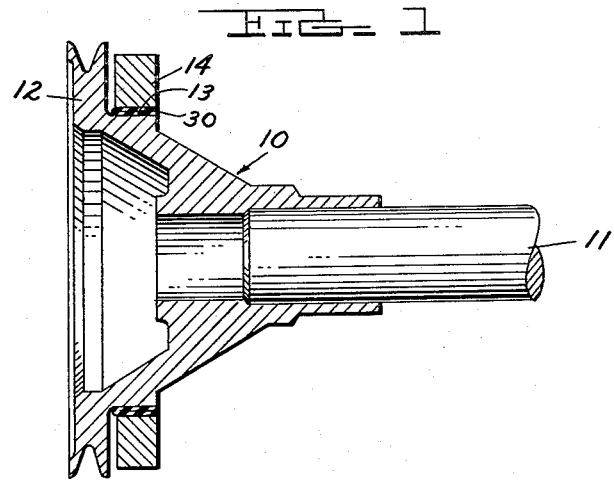
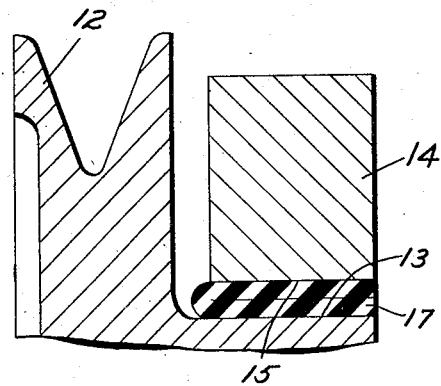 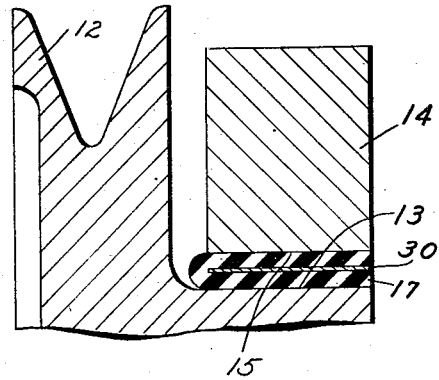
INVENTOR.
FRED L. HAUSHALTER
BY
ATTORNEYS

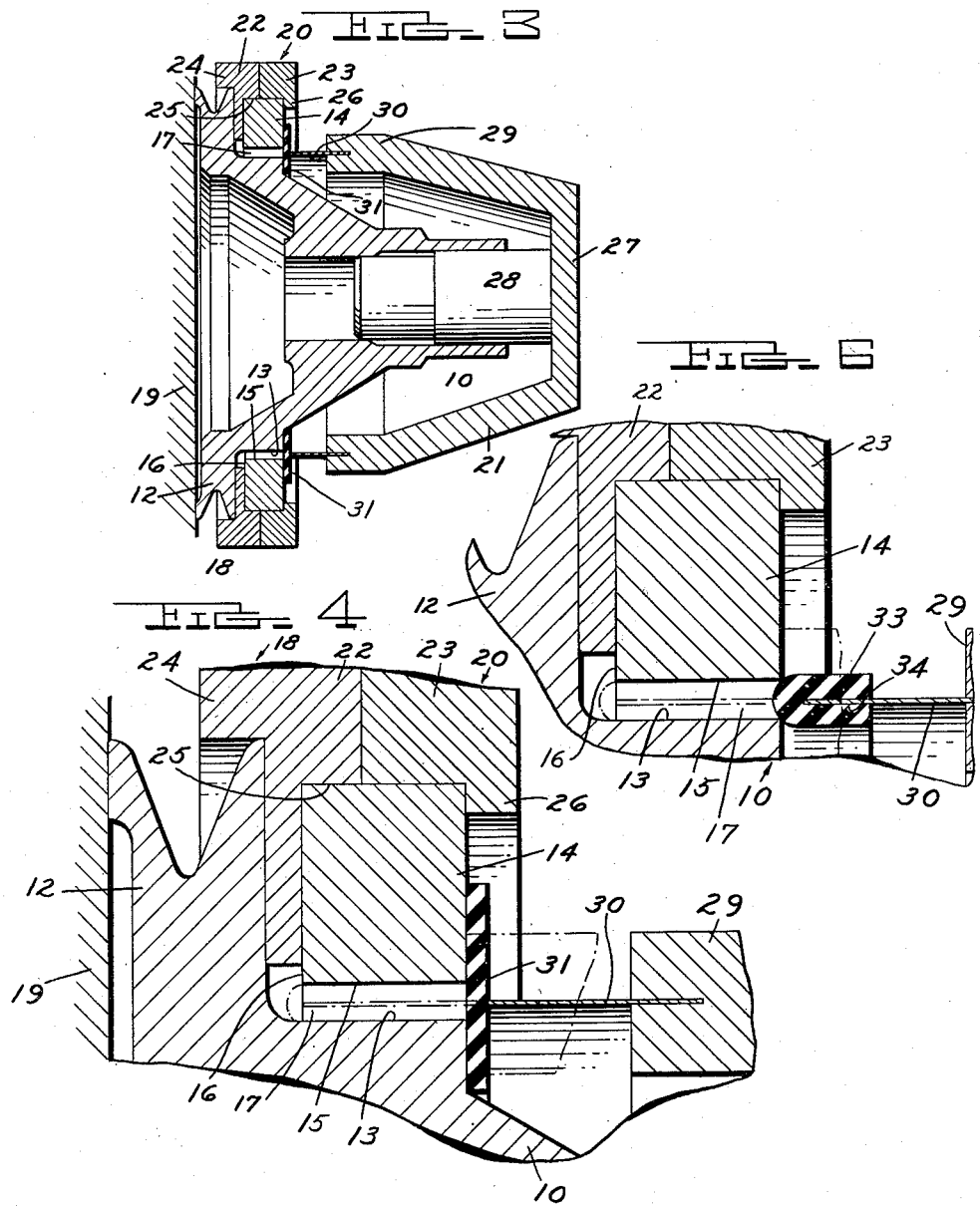

United States Patent Office
2,795,036
Patented June 11, 1957

2,795,036

METHOD OF MAKING A VIBRATION DAMPER

Fred L. Haushalter, Pontiac, Mich.

Application March 29, 1954, Serial No. 419,225

6 Claims. (Cl. 29—450)

This invention relates to devices or products embodying damping or shock absorbing means, and refers to an improved method of making such devices or products.

One application of the present invention is in connection with engine crankshafts for damping torsional and other noise producing vibrations, although it will be apparent as this description proceeds that this invention may be satisfactorily used in practically any device or product where it is desirable to yieldingly connect one element to another so that noise producing vibrations are dampened by reason of their being absorbed by the damper or yieldable connection between the elements.

With the above in view, it is an object of this invention to introduce an elastic relatively non-compressible material such, for example, as rubber between adjacent concentric surfaces of a pair of elements by stretching the material as it is inserted between said surfaces so that the material is placed under sufficient tension to securely hold the elements in assembled relationship while, at the same time, permitting the limited relative rotative movements of the elements required to effectively dampen torsional vibrations.

It is another object of this invention to provide a method of making a structure of the above general type wherein the elements are held in assembled relationship by the elastic material or rubber without the necessity of vulcanizing the rubber to either or both of the elements, and wherein the rubber or elastic material may be in the form of sheet stock. Thus, it is not necessary to mold the material or provide expensive operations for producing this material and the latter may be made to numerous different specified sizes with a minimum cost.

The foregoing as well as other objects will be made more apparent as this description proceeds especially when considered in connection with the accompanying drawings, wherein:

Figure 1 is a longitudinal sectional view of a device having damping means embodying the features of this invention;

Figure 2 is an enlarged sectional view of a part of the structure shown in Figure 1;

Figure 3 is a longitudinal sectional view of one type of apparatus that may be used for installing the damping material shown in Figure 1;

Figure 4 is an enlarged sectional view illustrating the manner in which the damping material is installed;

Figure 5 is a sectional view similar to Figure 2 showing another embodiment of the invention; and Figure 6 is an enlarged fragmentary sectional view of a modified form of damper.

Although it has been stated that the present invention may be satisfactorily used in practically any device or product where it is desired to dampen vibrations by a yielding connection between two parts, nevertheless, for the purpose of illustration, the invention is shown herein as employed in connection with the crank shaft of an internal combustion engine for absorbing torsional or noise producing vibrations of the shaft. In Figure 1 of the drawings, the numeral 10 designates a hub adapted to be keyed or otherwise secured to one end of an engine crank shaft 11 and having a part forming a belt engaging pulley 12. Formed on the hub 10 adjacent the pulley 12 is a cylindrical seat or surface 13 which is concentric with the hub axis and serves as a support for an inertia member 14.

The inertia member 14 is in the form of a ring having a cylindrical inner surface 15 of greater diameter than the surface 13 to provide an annular space 16 between said surfaces. The inertia member 14 is yieldingly mounted on the surface 13 of the hub 10 by a ring or annulus 17 of elastic relatively non-compressible material such, for example, as rubber installed into the annular space 16 between the surface 13 on the hub 10 and the surface 15 on the inertia member 14.

As will be presently described, the elastic ring 17 is formed of sheet material and is folded back upon itself to provide a double thickness of material between the cylindrical surfaces 13 and 15. The total thickness of the folded ring 17 of elastic material is substantially greater than the width of the annular space 16 so that the ring 17 must be pressed into the annular space 16. For reasons which will also be more fully understood from the following description, the ring 17 is stretched considerably when pressed into the annular space 16 so that the elastic material is placed under tension between the surfaces 13 and 15. The tension under which the ring 17 of elastic material is placed in the annular space 16 is sufficient to firmly hold the inertia member 14 in assembled relationship with the hub 10 without the necessity of bonding, cementing or otherwise securing the ring 17 to either or both the hub 10 and inertia member 14. However, even after being pressed or stretched in place within the annular space 16, the ring 17 possesses the yieldability required to absorb or dampen shocks or noise producing torsional vibrations.

Referring now to Figures 3 and 4 of the drawings, the numeral 18 designates a fixture that may be employed for the purpose of pressing the ring 17 of elastic material into the annular space 16 during assembly. The fixture 18 comprises a support 19, a spacer 20, and a head 21. The support 19 provides an abutment for engaging the outer side of the pulley 12 on the hub 10 and may be in the form of a surface plate, if desired. The spacer 20 is formed of two annular sections 22 and 23 removably clamped together in any suitable manner, not shown herein.

The section 22 has an annular flange 24 projecting from the front side thereof in concentric relationship with the hub axis and engageable with the periphery of the pulley 12. The rear face of the section 22 is recessed to provide an annular shoulder 25 concentric with the hub axis and engageable with the peripheral surface of the inertia member 14. The section 23 is clamped to the rear face of the section 22 radially outwardly beyond the shoulder 25 and has an annular flange 26 at the rear side. The flange 26 is engageable with the rear side of the inertia member 14 and cooperates with the section 22 in holding the inertia member 14 with its inner cylindrical surface 15 in concentric relationship to the cylindrical surface 13 on the hub 10.

The head 21 is generally cup-shaped having a base 27 provided with a shaft section 28 and having an annular flange 29 encircling the shaft section 28. The shaft section 28 has a sliding fit with the bore in the hub and cooperates with the base to pilot movement of the head 21 along the axis of the hub 10. The annular flange 29 has an annular groove in the free edge for receiving a steel ring 30. The ring 30 projects axially from the flange 29 in concentric relationship to the axis of the hub 10 and registers with the annular space 16. The thickness of the ring 30 is substantially less than the width of the annular space 16 so that the projecting end of the ring 30 freely enters the annular space 16 upon movement of the head 21 relative to the hub 10 in a direction toward the support 19.

It has been stated that the ring 17 comprises a sheet of elastic material or rubber folded upon itself to provide a double thickness of the material. The numeral 31 indicates a flat strip or sheet of rubber in the form of a disk centrally apertured to provide clearance for the hub 10 and having a thickness depending upon the width of the annular space 16. In any case, the thickness of the disk 31 is such that when the disk is folded to form the ring 17 it has a total thickness substantially greater than the width of the annular space 16.

The internal diameter of the centrally apertured disk 31 is substantially less than the diameter of the cylindrical surface 13 on the hub 10 and the outside diameter of the disk 31 is greater than the diameter of the inner cylindrical surface 15 on the inertia member 14. Thus, when the disk 31 is located in the position shown in Figure 3 it bridges the adjacent end of the annular space 16, and overlies the adjacent surfaces of the hub 10 and inertia member 14. Hence, movement of the head 21 in a direction toward the support 19 from the position shown in Figure 3 engages the free edge of the ring 30 with the portion of the disk 31 registering with the annular space 16 and displaces the disk into the annular space 16. As the disk 31 is pressed into the annular space 16 it is folded upon itself and is stretched to a considerable extent due to the fact that the space available for receiving the disk material is not sufficient to accommodate this material in its natural state. In order to avoid damaging the elastic material and permit readily removing the ring 30 from the folded disk, a lubricant of a type capable of being readily absorbed by the elastic material is applied to the steel ring 30. The ring 30 is very thin so as to occupy a minimum space within the annular space 16 and need not be removed. However, regardless of whether the ring 30 is left in place or is removed from the annular space 16, the elastic material is placed under sufficient tension between the cylindrical surface 13 on the hub 10 and the cylindrical surface 15 on the inertia member 14 to firmly hold the latter in assembled relationship with the hub 10 without the necessity of bonding or otherwise securing the elastic material to either the surface 13 or the surface 15. At the same time, the elastic material of the ring 17 affords sufficient yieldability between the hub 10 and inertia member 14 to assure effectively absorbing shocks or torsional vibrations.

In instances where the steel ring 30 is left in place between the folds of the elastic ring 17, greater stability of the inertia member 14 is obtained and this practice is especially advantageous where it is desired to increase the allowable deflection in either torsion or shear by providing a ring 17 of greater thickness. One application for an arrangement of the above type is in the production of timing gears, for example, having a web and having a beveled toothed rim connected to the web by a ring of elastic material similar to the ring 17. The torque applied to the beveled teeth on the rim of the gear has a tendency to displace the rim relative to the web in an axial direction and such displacement would be counteracted or resisted by the steel ring 30, as shown in Figure 5.

In the embodiment of the invention shown in Figure 6 of the drawings, the disk 31 is replaced by a ring 33 of elastic material such as rubber. The ring 33 has a thickness substantially greater than the annular space 16 and is formed with an annular slot 34 for receiving the projecting end of the steel ring 30. The ring 33 is pressed into the annular space 16 in the same manner previously described in connection with the ring 17 and when inserted into the annular space 16 performs the same results as the ring 17.

Both embodiments of the invention are advantageous in that they provide an inexpensive and highly effective damper wherein the elastic material or rubber securely holds the parts in proper assembled relationship without resorting to the time consuming and costly bonding operations heretofore considered necessary. Moreover, the cost of producing the first embodiment of the invention is further reduced by rendering it possible to form the disk 31 from sheet stock cut to within very close limits of a specified thickness by conventional automatic slicing machines. Thus, mold and equipment costs, as well as labor expense, are entirely eliminated.

What I claim as my invention is:

1. The method of making a damper having rotatable parts provided with adjacent cylindrical surfaces concentric with the axis of rotation of the parts and spaced from each other which consists in relatively positioning and holding the parts with the cylindrical surfaces aforesaid in spaced concentric relationship to provide an annular space therebetween, bridging the annular space at one end thereof with a ring of elastic stock, providing a relatively thin cylindrical rigid annulus, engaging a relatively narrow localized annular area of the ring intermediate said cylindrical surfaces with said annulus, moving the annulus into the annular space to stretch the elastic stock while displacing the stock into the annular space and thereby place the stock under tension between the cylindrical surfaces.

2. The method described in claim 1 in which the ring comprises a flat annular member which is folded upon itself when it is displaced into said annular space.

3. The method described in claim 2 in which the axial thickness of the ring is substantially greater than half the radial distance between said cylindrical surfaces and is substantially reduced after it is folded upon itself and stretched.

4. The method described in claim 1 in which the annulus remains permanently embedded in the elastic stock by frictional engagement with said stock after the latter has been stretched.

5. The method described in claim 1 in which the radial width of the ring is greater than the space between said cylindrical surfaces and the localized area consists of an annular groove concentric with said cylindrical surfaces.

6. The method specified in claim 1 comprising the additional steps of lubricating the annulus prior to moving the latter into said annular space, and subsequently withdrawing the annulus.

References Cited in the file of this patent
UNITED STATES PATENTS

| | | |
|---|---|---|
| 1,874,515 | Harris | Aug. 30, 1932 |
| 1,928,763 | Rosenberg | Oct. 3, 1933 |
| 2,594,555 | Hardy | Apr. 29, 1952 |
| 2,763,055 | Hardy | Sept. 18, 1956 |

FOREIGN PATENTS

| | | |
|---|---|---|
| 380,492 | Great Britain | Sept. 12, 1932 |